US012081493B2

(12) United States Patent
Li et al.

(10) Patent No.: US 12,081,493 B2
(45) Date of Patent: Sep. 3, 2024

(54) METHOD FOR ENHANCED DIRECT SECONDARY CELL ACTIVATION (71) Applicant: Apple Inc., Cupertino, CA (US)

(72) Inventors: Qiming Li, Beijing (CN); Jie Cui, San Jose, CA (US); Dawei Zhang, Saratoga, CA (US); Yang Tang, San Jose, CA (US); Yushu Zhang, Beijing (CN); Fangli Xu, Beijing (CN); Manasa Raghavan, Sunnyvale, CA (US); Huaning Niu, San Jose, CA (US); Xiang Chen, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,600

(22) PCT Filed: Jan. 14, 2021

(86) PCT No.: PCT/CN2021/071855
§ 371 (c)(1),
(2) Date: Sep. 21, 2021

(87) PCT Pub. No.: WO2022/151207
PCT Pub. Date: Jul. 21, 2022

(65) Prior Publication Data
US 2023/0396396 A1 Dec. 7, 2023

(51) Int. Cl.
*H04L 5/00* (2006.01)
*H04W 72/20* (2023.01)
(52) U.S. Cl.
CPC .......... *H04L 5/0091* (2013.01); *H04L 5/0051* (2013.01); *H04W 72/20* (2023.01)
(58) Field of Classification Search
CPC ..... H04L 5/0091; H04L 5/0051; H04W 72/20
(Continued)

(56) References Cited
U.S. PATENT DOCUMENTS

2019/0058517 A1* 2/2019 Kang ...................... H04L 5/005
2019/0173740 A1* 6/2019 Zhang ................. H04L 41/0677
(Continued)

FOREIGN PATENT DOCUMENTS

| CN | 110785958 A | 2/2020 |
| CN | 111866936 A | 10/2020 |
| WO | WO 2020/164115 A1 | 8/2020 |

OTHER PUBLICATIONS

International Search Report and Written Opinion of the International Searching Authority directed to related International Patent Application No. PCT/CN2021/071855, mailed Oct. 14, 2021; 8 pages.
(Continued)

*Primary Examiner* — Mark G. Pannell
(74) *Attorney, Agent, or Firm* — Sterne, Kessler, Goldstein & Fox P.L.L.C.

(57) ABSTRACT

Some embodiments include an apparatus, method, and computer program product for enhanced direct secondary cell activation in a 5G wireless communications system. A user equipment (UE) can receive a Radio Resource Control (RRC) command from a 5G Node B (gNB) via a Primary Cell (PCell) or via a Primary Secondary Cell (PSCell) that includes configuration data for a Secondary Cell (SCell), where the SCell operates in Frequency Range 2 (FR2). The RRC command includes a first Transmission Configuration Indicator (TCI) state for the SCell, and the UE can activate the SCell for the UE based at least on the configuration data, concurrently with the first TCI state for receiving the PDCCH transmission. The UE can receive a Physical Downlink Control Channel (PDCCH) transmission via a first antenna beam from the SCell, where the first antenna beam is based on the first TCI state.

20 Claims, 10 Drawing Sheets (58) Field of Classification Search
USPC .......................................................... 370/329
See application file for complete search history.

(56) References Cited

U.S. PATENT DOCUMENTS

| | | | | |
|---|---|---|---|---|
| 2019/0174466 | A1* | 6/2019 | Zhang | H04L 5/0057 |
| 2019/0254110 | A1* | 8/2019 | He | H04L 5/0048 |
| 2019/0297547 | A1* | 9/2019 | Tsai | H04L 5/0048 |
| 2019/0373450 | A1* | 12/2019 | Zhou | H04L 5/001 |
| 2020/0045709 | A1* | 2/2020 | Seo | H04W 72/53 |
| 2020/0100222 | A1* | 3/2020 | Chakraborty | H04W 72/23 |
| 2020/0136895 | A1* | 4/2020 | Venugopal | H04L 5/001 |
| 2020/0221485 | A1* | 7/2020 | Cirik | H04L 25/0226 |
| 2020/0260500 | A1* | 8/2020 | Agiwal | H04W 28/0278 |
| 2020/0267048 | A1* | 8/2020 | Yu | H04B 7/0695 |
| 2020/0383167 | A1* | 12/2020 | Sengupta | H04W 74/0833 |
| 2020/0396731 | A1* | 12/2020 | Venugopal | H04L 5/0048 |
| 2021/0028849 | A1* | 1/2021 | Chin | H04B 7/06964 |
| 2021/0051710 | A1* | 2/2021 | Cirik | H04L 5/0053 |
| 2021/0112619 | A1* | 4/2021 | Bai | H04W 24/04 |
| 2021/0385896 | A1* | 12/2021 | Kim | H04W 36/0027 |
| 2022/0149926 | A1* | 5/2022 | You | H04B 7/088 |
| 2023/0093299 | A1* | 3/2023 | Yoshimura | H04L 5/0082 |
| | | | | 370/329 |
| 2023/0262824 | A1* | 8/2023 | Huang | H04W 76/20 |
| | | | | 370/329 |

OTHER PUBLICATIONS

ZTE Corporation, et al., "On Directly Configuring SCell as Activated," R2-1907096, 3GPP TSG-RAN WG2 Meeting #106, Reno, USA, May 17, 2019; 2 pages.

ZTE Corporation, et al., "On Directly Configuring SCell as Activated," R2-1913489, 3GPP TSG-RAN WG2 Meeting #107bis, Chongquing, China, Sep. 18, 2019; 3 pages.

* cited by examiner

```
sCellConfig ::=            SEQUENCE{
    sCellIndex              sCellIndex,
    sCellConfigCommon       ServingCellConfigCommon
    sCellConfigDedicated    ServingCellConfig
    ...,
    [[
    smtc                    SSB-MTC
    ]],
    [[
    sCellState-r16                               ENUMERATED {activated}
    secondaryDRX-GroupConfig-r16 ENUMERATED {true}
    firstTciStatePDCCH      OF TCI-StateId
    ]]}
```

410

```
ControlResourceSet ::=      SEQUENCE {
    controlResourceSetId        ControlResourceSetId,
    frequencyDomainResources    BIT STRING (SIZE (45)),
    duration                    INTEGER (1..maxCoReSetDuration),
    cce-REG-MappingType         CHOICE{
        interleaved                 SEQUENCE{
            reg-BundleSize              ENUMERATED {n2, n3, n6},
            interleaverSize             ENUMERATED {n2, n3, n6},
            shiftIndex                  INTEGER (0..maxNrofPhysicalResourceBlocks-1) OPTIONAL,  -- Need S
        },
        nonInterleaved              NULL
    },
    precoderGranularity         ENUMERATED {sameAsREG-bundle, allContiguousRBs},
    tci-StatesPDCCH-ToAddList   SEQUENCE (SIZE (1..maxNrofTCI-StatesPDCCH))OF TCI-StateId OPTIONAL,
    firstTciStatePDCCH          of TCI-StateId
    tci-StatesPDCCH-ToReleaseList SEQUENCE (SIZE (1..maxNrofTCI-StatesPDCCH))OF TCI-StateId OPTIONAL,
    tci-PresentInDCI            ENUMERATED {enabled}                                   OPTIONAL,  -- Need S
    pdcch-DMRS-ScramblingID     INTEGER (0..65535)                                     OPTIONAL,  -- Need S
    ...,
    [[
    rb-Offset-r16               INTEGER (0..5)                                         OPTIONAL,  -- Need S
    tci-PresentDCI-1-2-r16      INTEGER (1..3)                                         OPTIONAL,  -- Need S
    coresetPoolIndex-r16        INTEGER (0..1)                                         OPTIONAL,  -- Need S
    controlResourceSetId-v1610  ControlResourceSetId-v1610                             OPTIONAL,  -- Need S
    ]]
}
```

FIG. 4

```
sCellConfig ::=            SEQUENCE{
    sCellIndex                 sCellIndex,
    sCellConfigCommon          ServingCellConfigCommon
    sCellConfigDedicated       ServingCellConfig
    ...,
    [[
    smtc                       SSB-MTC
    ]],
    [[
    sCellState-r16                              ENUMERATED {activated}
    secondaryDRX-GroupConfig-r16 ENUMERATED {true}
    firstTciStatePDSCH         OF TCI-StateId
    ]]}
```

510 ⟶ 520 ⟶

```
ControlResourceSet ::=      SEQUENCE {
    controlResourceSetId,       ControlResourceSetId,
    frequencyDomainResources    BIT STRING (SIZE (45)),
    duration                    INTEGER (1..maxCoReSetDuration),
    cce-REG-MappingType         CHOICE{
        interleaved                 SEQUENCE{
            reg-BundleSize              ENUMERATED {n2, n3, n6},
            interleaverSize             ENUMERATED {n2, n3, n6},
            shiftIndex                  INTEGER (0..maxNrofPhysicalResourceBlocks-1) OPTIONAL, -- Need S
        },
        nonInterleaved              NULL
    },
    precoderGranularity         ENUMERATED {sameAsREG-bundle, allContiguousRBs},
    tci-StatesPDCCH-ToAddList   SEQUENCE (SIZE (1..maxNrofTCI-StatesPDCCH)) OF TCI-StateId OPTIONAL,
    firstTciStateId             of TCI-StateId
    tci-StatesPDCCH-ToReleaseList SEQUENCE (SIZE (1..maxNrofTCI-StatesPDCCH)) OF TCI-StateId OPTIONAL,
    tci-PresentInDCI            ENUMERATED {enabled}                             OPTIONAL, -- Need S
    pdcch-DMRS-ScramblingID     INTEGER (0..65535)                               OPTIONAL, -- Need S
    ...,
    [[
    rb-Offset-r16               INTEGER (0..5)                                   OPTIONAL, -- Need S
    tci-PresentDCI-1-2-r16      INTEGER (1..3)                                   OPTIONAL, -- Need S
    coresetPoolIndex-r16        INTEGER (0..1)                                   OPTIONAL, -- Need S
    controlResourceSetID-v1610  ControlResourceSetId-v1610                       OPTIONAL, -- Need S
    ]]
}
```

```
SCellConfig ::=            SEQUENCE{
    sCellIndex                  sCellIndex,
    sCellConfigCommon           ServingCellConfigCommon
    sCellConfigDedicated        ServingCellConfig
    ...,
    [[
    smtc                        SSB-MTC
    ]],
    [[
    sCellState-r16              ENUMERATED {activated}
    secondaryDRX-GroupConfig-r16 ENUMERATED {true}
    firstSpatialRelationInfoPUCCH    OF PUCCH-SpatialRelationInfo
    ]]}
```

```
PUCCH-Config ::=    SEQUENCE {
    resourceSetToAddModList       SEQUENCE (SIZE (1..maxNrofPUCCH-ResourceSets)) OF PUCCH-ResourceSet       OPTIONAL,  -- Need N
    resourceSetToReleaseList      SEQUENCE (SIZE (1..maxNrofPUCCH-ResourceSets)) OF PUCCH-ResourceSetId     OPTIONAL,  -- Need N
    resourceToAddModList          SEQUENCE (SIZE (1..maxNrofPUCCH-Resources)) OF PUCCH-Resource             OPTIONAL,  -- Need N
    resourceToReleaseList         SEQUENCE (SIZE (1..maxNrofPUCCH-Resources)) OF PUCCH-ResourceId           OPTIONAL,  -- Need N
    format1                       SetupRelease { PUCCH-FormatConfig }                                       OPTIONAL,  -- Need M
    format2                       SetupRelease { PUCCH-FormatConfig }                                       OPTIONAL,  -- Need M
    format3                       SetupRelease { PUCCH-FormatConfig }                                       OPTIONAL,  -- Need M
    format4                       SetupRelease { PUCCH-FormatConfig }                                       OPTIONAL,  -- Need M
    schedulingRequestResourceToAddModList   SEQUENCE (SIZE (1..maxNrofSR-Resources)) OF SchedulingRequestResourceConfig
                                                                                                             OPTIONAL, -- Need N
    schedulingRequestResourceToReleaseList  SEQUENCE (SIZE (1..maxNrofSR-Resources)) OF SchedulingRequestResourceId
                                                                                                             OPTIONAL, -- Need N
    multi-CSI-PUCCH-ReosurceList  SEQUENCE (SIZE (1..2)) OF PUCCH-ResourceId                                 OPTIONAL,  -- Need M
    dl-DataToUL-ACK               SEQUENCE (SIZE (1..8)) OF INTEGER (0..15)                                  OPTIONAL,  -- Need M
    spatialRelationInfoToAddModList SEQUENCE (SIZE (1..maxNrofSpatialRelationInfos)) OF PUCCH-SpatialRelationInfo
                                                                                                             OPTIONAL, -- Need N
    firstSpatialRelationInfoPUCCH    of PUCCH-SpatialRelationInfo
    spatialRelationInfoToReleaseList  SEQUENCE (SIZE (1..maxNrofSpatialRelationInfos)) OF PUCCH-SpatialRelationInfoId
                                                                                                             OPTIONAL, -- Need N
    pucch-PowerControl            PUCCH-PowerControl
    ...,
```

METHOD FOR ENHANCED DIRECT SECONDARY CELL ACTIVATION

This application is a U.S. National Phase of International Application No. PCT/CN2021/071855, filed Jan. 14, 2021, which is hereby incorporated by reference in its entirety.

BACKGROUND

Field

The described embodiments relate generally to secondary cell activation in a fifth generation (5G) wireless communications system.

Related Art 5G wireless communications systems support secondary cell activation in a 5G wireless communications system between a 5G Node B (gNB) and a communications device in Frequency Range 1 (FR1).

SUMMARY

Some embodiments include an apparatus, method, and computer program product for enhanced direct Secondary Cell (SCell) activation where the SCell operates in Frequency Range 2 (FR2). Some embodiments include a user equipment (UE), including a transceiver configured to operate in a wireless network (e.g., a 5G New Radio wireless network.) A processor coupled to the transceiver can receive, via the transceiver, a Radio Resource Control (RRC) command from a 5G Node B (gNB), including configuration data for a SCell, where the SCell operates in FR2, and where the RRC command includes a first Transmission Configuration Indicator (TCI) state for the SCell. The UE can concurrently activate the SCell for the UE based at least on the configuration data, and the first TCI state for receiving the PDCCH transmission. The UE can receive a first antenna beam comprising a Physical Downlink Control Channel (PDCCH) transmission from the SCell, where the first antenna beam is based on the first TCI state. To receive the first antenna beam comprising the PDCCH transmission from the SCell, the UE can activate the default TCI state for receiving the PDCCH transmission.

The UE can receive a second TCI state for the SCell for receiving a Physical Downlink Shared Channel (PDSCH) transmission, and receive a second antenna beam comprising a PDSCH transmission from the SCell, where the second antenna beam is based on the second TCI state. In some embodiments, the first TCI state can be used for the SCell for PDSCH transmission reception. The UE can activate the second TCI state for receiving the PDSCH transmission. The UE can concurrently activate the SCell for the UE based at least on the configuration data, and the second TCI state for receiving the PDSCH transmission. To receive the second TCI state, the UE can receive a ControlResourceSet RRC command including the second TCI state. In some embodiments, the RRC command is an SCellConfig RRC command that comprises the second TCI state.

In some embodiments the UE can receive antenna beam transmission information for PUCCH transmission in the SCell, and transmit a PUCCH transmission via a second antenna beam to the SCell based at least on the antenna beam transmission info cation. In some embodiments when there is no PUCCH transmission in the SCell, the UE can transmit a PUCCH transmission via a Primary Cell (PCell), a Primary SCell (PSCell) or other SCells. When the antenna beam transmission information comprises multiple candidate spatialRelationInfo parameters, the UE can activate a default spatialRelationInfo parameter for PUCCH transmission from the multiple candidate spatialRelationInfo parameters, where the default spatialRelationInfo parameter corresponds to the antenna beam transmission information. The UE can concurrently activate the SCell for the UE based at least on the configuration data, and the default spatialRelationInfo parameter for PUCCH transmission. To receive the antenna beam transmission information, the processor is configured to receive a PUCCH-Config RRC command comprising a spatialRelationInfo parameter. In some embodiments, the RRC command is an SCellConfig RRC command that comprises a spatialRelationInfo parameter.

In some embodiments, the UE can receive semi-persistent (SP) Channel State Information (CSI)-Reference Signal (RS) for PUCCH transmission in the SCell, and transmit a CSI report in a PUCCH transmission in the SCell based at least on the SP CSI-RS for PUCCH transmission. When the SP CSI for PUCCH transmission includes a pucch-CSI-ResourceList parameter, the UE can activate a default pucch-CSI-ResourceList parameter for PUCCH transmission, wherein the default pucch-CSI-ResourceList parameter corresponds to the received SP CSI-RS. The UE can receive the SP CSI-RS for PUCCH transmission via a CSI-ReportConfig RRC command. In some embodiments the RRC command is an SCellConfig RRC command that includes the SP CSI-RS for PUCCH transmission.

Some embodiments include a gNB that includes a transceiver configured to operate in a wireless network, and a processor coupled to the transceiver. The gNB can transmit an RRC command for: concurrent activation of a Secondary Cell (SCell) and a first Transmission Configuration Indicator (TCI) state for the SCell, where the SCell operates in FR2. The gNB can transmit a first antenna beam including a PDCCH transmission via the SCell, wherein the first antenna beam is based on the first TCI state. The gNB can transmit, a second TCI state for the SCell for PDSCH transmission, and transmit a second antenna beam including a PDSCH transmission from the SCell, where the second antenna beam is based on the second TCI state.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In a 5G wireless communications system operating in Frequency Range 1 (FR1), a 5G Node B (gNB) can be a base station that transmits a Radio Resource Control (RRC) command to a User Equipment (UE) for direct Secondary Cell (SCell) activation. When an SCell operates in Frequency Range 2 (FR2), in addition to an RRC command, the gNB transmits separate Media Access Control (MAC) commands regarding UE antenna beam reception and transmission information, and semi-persistent (SP) Channel State Information (CSI) Reference Signals (RSs) to enable direct SCell activation. The UE utilizes time to wait for receiving the MAC commands (e.g., $T_{uncertainty\_time}$) and to process the MAC commands ($T_{activation\_time}$). For example, the $T_{activation\_time}$ includes MAC command decoding time for a UE to decode MAC commands to activate Physical Downlink Control Channel (PDCCH) Transmission Configuration Indicator (TCI) for UE, Physical Downlink Shared Channel (PDSCH) TCI for UE, and/or SP CSI reporting on PDCCH.

Some embodiments include additional fields in one or more RRC commands in support of enhanced direct SCell activation. For example, separate MAC commands may not be needed, thus $T_{uncertainty\_time}$ and ($T_{activation\_time}$) are unnecessary. Accordingly, with embodiments for enhanced direct SCell activation, a UE can activate an SCell faster than direct SCell activation with corresponding MAC commands. The acceleration can also be beneficial for enabling faster handover as well as resuming a connection (e.g., RRC Resume command) compared to direct SCell activation with corresponding MAC commands.

Figure 1:
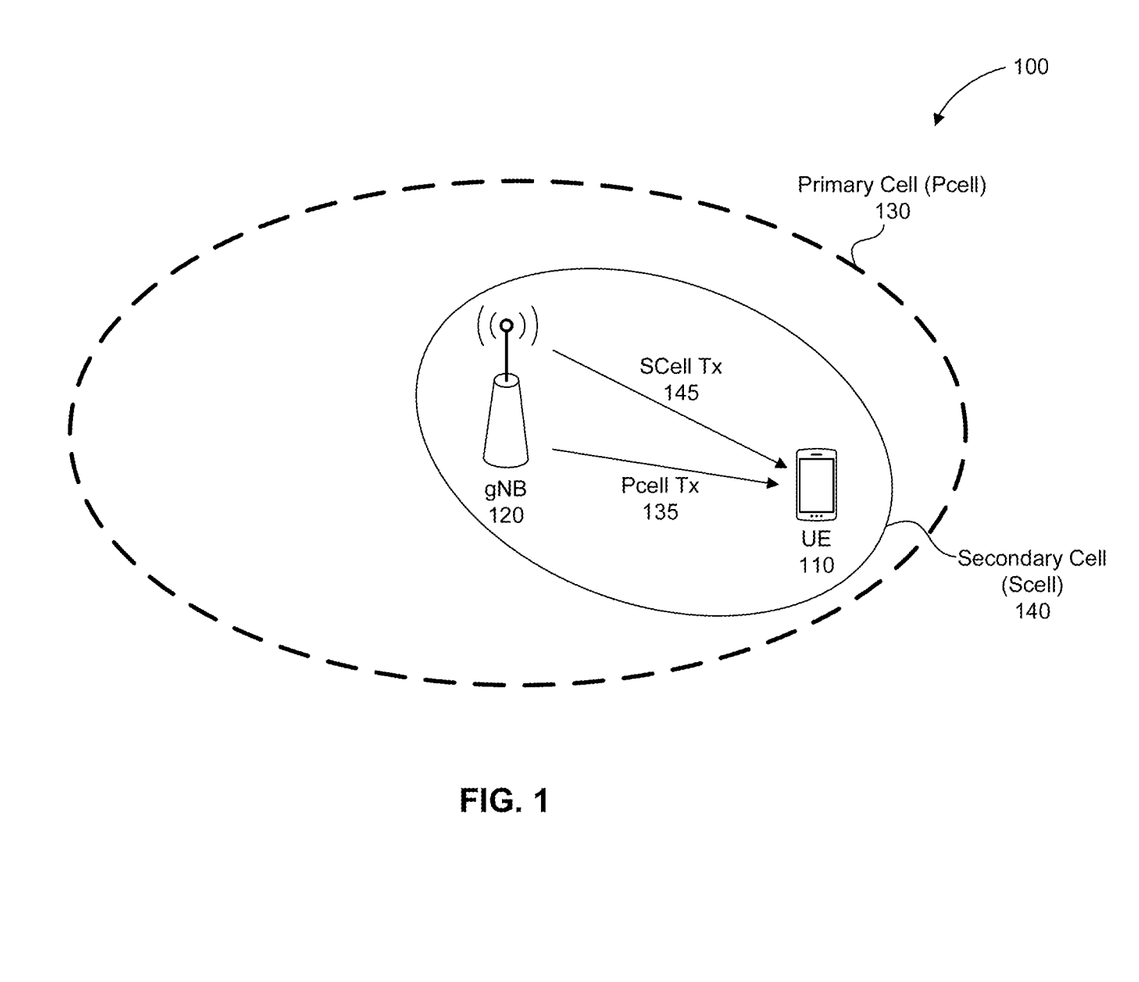
FIG. 1 illustrates an example system for enhanced direct Secondary Cell (SCell) activation, in accordance with some embodiments of the disclosure.

FIG. 1 illustrates an example system 100 for enhanced direct SCell activation, in accordance with some embodiments of the disclosure. System 100 includes UE 110, gNB 120, Primary Cell (PCell) 130 and SCell 140, where SCell 140 operates in Frequency Range 2 (FR2). For example, gNB 120 can transmit an RRC command via PCell transmission 135 to UE 110 for direct activation of SCell 140. UE 110 can use the information in the RRC command to configure reception of an antenna beam from SCell 140 that includes SCell transmission 145. In some embodiments, an SCell can be supported by a gNB that is different than gNB 120. In some embodiments, the RRC command can be transmitted by a gNB via a Primary Secondary Cell (PSCell) to UE 110.

Figure 2:
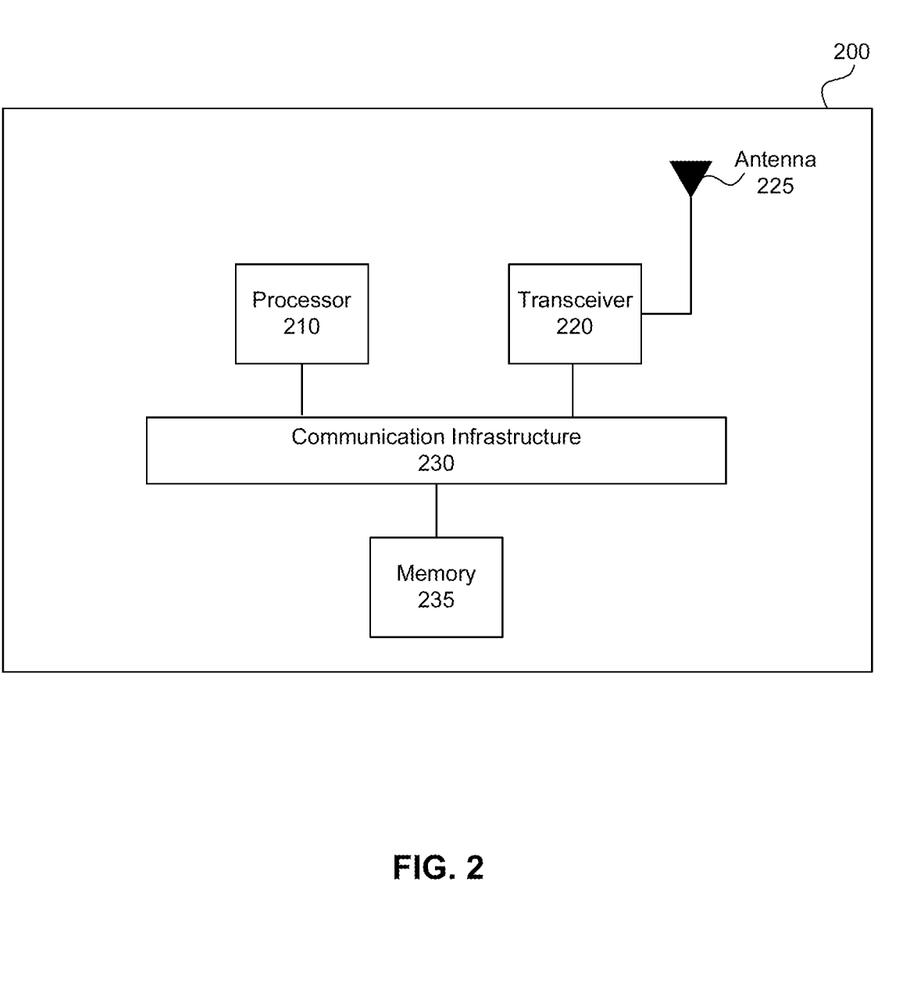
FIG. 2 illustrates a block diagram of an example wireless system for enhanced direct SCell activation, according to some embodiments of the disclosure.

FIG. 2 illustrates a block diagram of an example wireless system 200 for enhanced direct SCell activation, according to some embodiments of the disclosure. As a convenience and not a limitation, system 200, may be described with elements of FIG. 1. For example, system 200 can be UE 110 or gNB 120 of FIG. 1. UE 110 may be a computing electronic device such as a smart phone, cellular phone, and for simplicity purposes—may include other computing devices including but not limited to laptops, desktops, tablets, personal assistants, routers, monitors, televisions, printers, and appliances. System 200 may include processor 210, transceiver 220, communication infrastructure 230, memory 235, and antenna 225 that together perform operations for enhanced direct SCell activation. Transceiver 220 transmits and receives 5G wireless communications signals via antenna 225. Communication infrastructure 230 may be a bus. Memory 235 may include random access memory (RAM) and/or cache, and may include control logic (e.g., computer software), computer instructions, and/or data. Processor 210, upon execution of the computer instructions, can be configured to perform the functionality described herein for enhanced direct SCell activation. Alternatively, processor 210 can include its own internal memory (not shown), and/or be "hard-wired" (as in a state-machine) configured to perform the functionality described herein for enhanced direct SCell activation. Antenna 225 coupled to transceiver 220, may include one or more antennas that may be the same or different types to enable wireless communication over a wireless network.

Figure 3A:
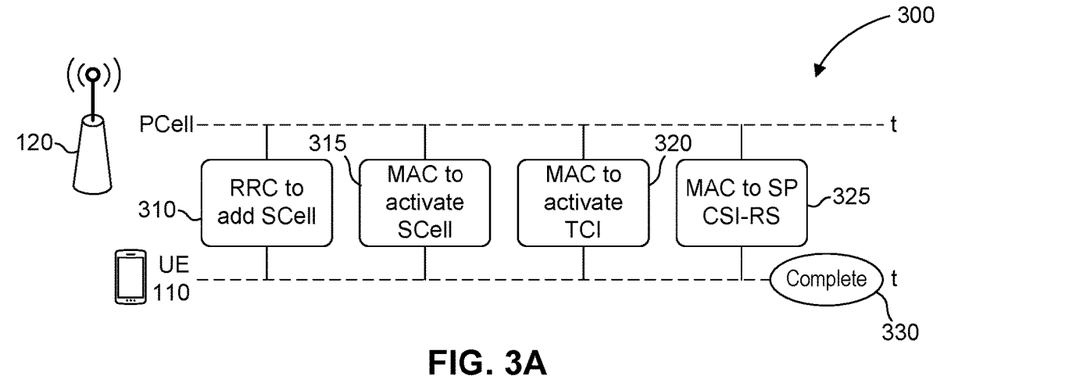
FIG. 3A illustrates an example of SCell activation, according to some embodiments of the disclosure.

FIG. 3A illustrates example 300 of SCell activation, according to some embodiments of the disclosure. As a convenience and not a limitation, FIGS. 3A, 3B, and 3C may be described with elements of FIGS. 1 and 2. In example 300, gNB 120 transmits at least 4 signals to UE 110 before SCell 140 operating in FR2 is activated. For example, gNB 120 transmits via PCell transmission 135, RRC command 310 to add SCell 140 as part of the wireless 5G network. At this point UE 110 is configured with information about SCell 140, but SCell 140 is deactivated. Subsequently, gNB 120 transmits additional signals (not shown in FIG. 1) via PCell 130 including: MAC command 315 to activate SCell 140; MAC command 320 to activate a Transmission Configuration Indicator (TCI) so UE 110 can know which antenna beam to use to receive a PDCCH transmission from SCell 140; and MAC command 325 for CSI-RS activation (e.g., if semi-persistent (SP) CSI-RS is used) for CSI reporting. After transmitting the 4 signals, SCell 140 operating in FR2 is activated noted by complete state 330.

Figure 3B:
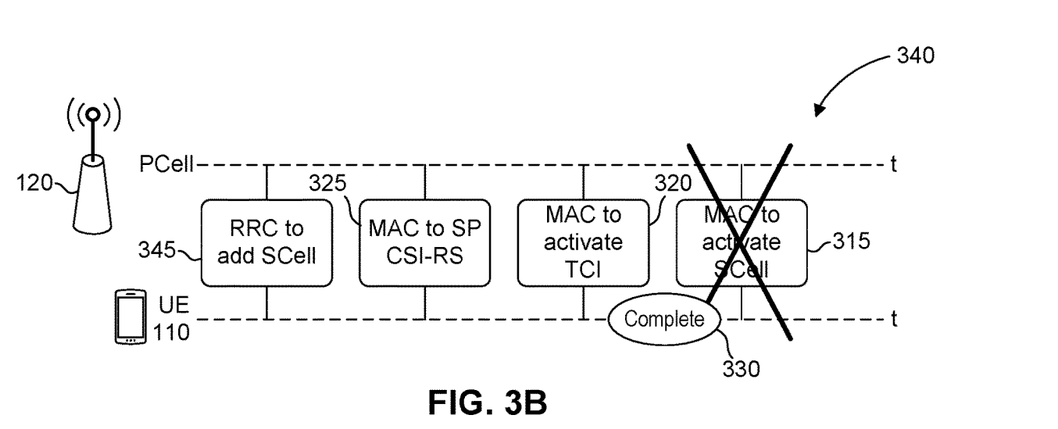
FIG. 3B illustrates an example of direct SCell activation, according to some embodiments of the disclosure.

FIG. 3B illustrates example 340 of direct SCell activation, according to some embodiments of the disclosure. Example 340 is similar to example 300, but RRC command 345 to add SCell 140 (e.g., configure UE 110 with SCell 140 information) includes data to concurrently activate SCell 140, without needing to receive any other command or signal from the serving gNB (e.g., gNB 120). Thus, RRC command 345 eliminates the need for MAC command 315 to activate SCell 140.

Figure 3C:
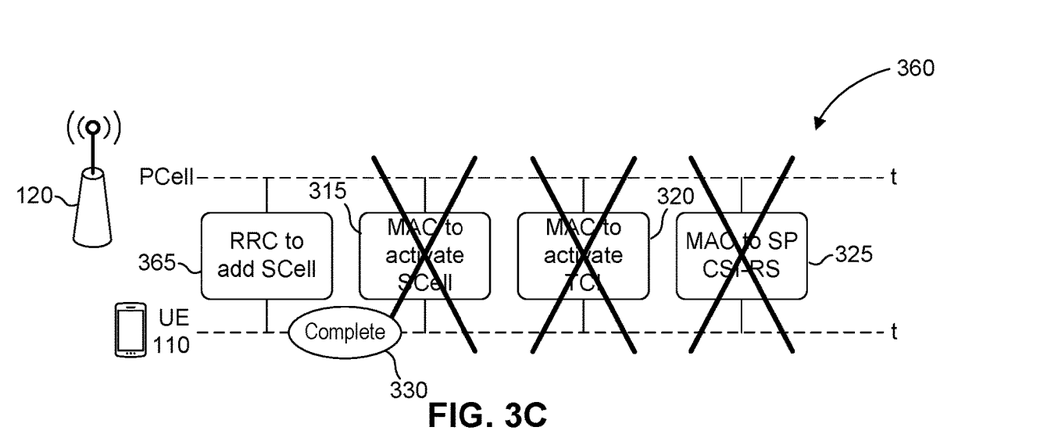
FIG. 3C illustrates an example of enhanced direct SCell activation, according to some embodiments of the disclosure.

FIG. 3C illustrates example 360 of enhanced direct SCell activation, according to some embodiments of the disclosure. Example 360 is similar to example 300, but RRC command 365 to add SCell 140 includes data to: concurrently activate SCell 140, activate a TCI state for UE 110 to know which antenna beam to use to receive a PDCCH transmission, and initiate CSI-RS activation (e.g., if semi-persistent (SP) CSI-RS is used) for CSI reporting without needing to receive any other command or signal from the serving gNB (e.g., gNB 120). Thus, RRC command 365 eliminates the need for MAC commands 315, 320, and 325. RRC command 365 can also include data to activate a TCI state for UE 110 to know which antenna beam to use to receive a PDSCH transmission, and another ICI state for UE 110 to know which antenna beam to use to transmit a PUCCH transmission. In some embodiments, RRC command 365 can be transmitted by gNB 120 via PCell 130 or a Primary Secondary Cell (PSCell) (not shown) to UE 110.

Figure 4:
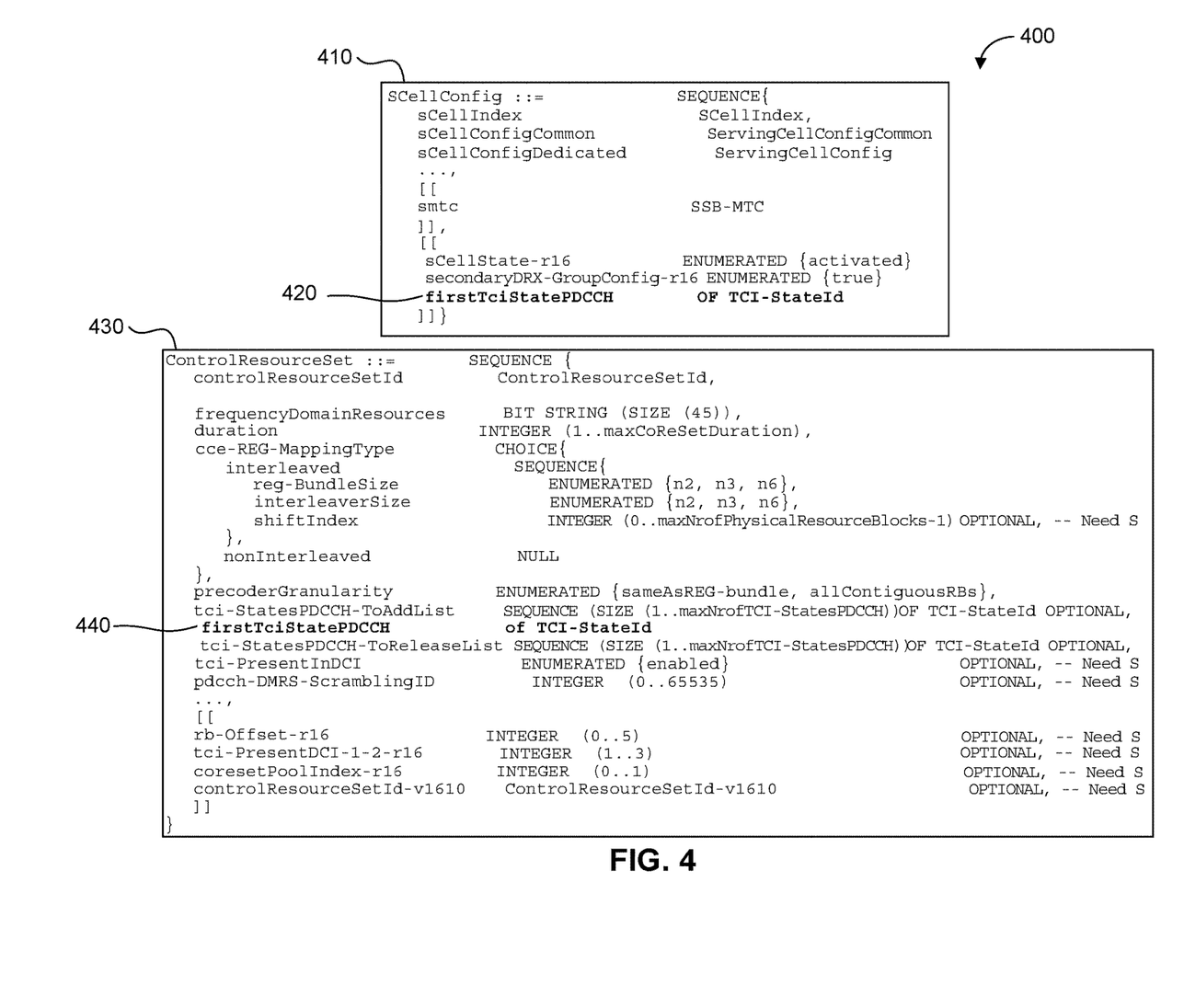
FIG. 4 illustrates example Radio Resource Control (RRC) commands including a Transmission Configuration Indicator (TCI) state activation for a Physical Downlink Control Channel (PDCCH) transmission supporting enhanced direct SCell activation, according to some embodiments of the disclosure.

FIG. 4 illustrates example 400 RRC commands including a TCI state activation for a PDCCH transmission supporting enhanced direct SCell activation, according to some embodiments of the disclosure. As a convenience and not a limitation, FIG. 4 may be described with elements of other figures in this disclosure. For example, the RRC commands of example 400 can be RRC command 365 of FIG. 3C. Example 400 illustrates RRC commands: SCellConfig 410 and ControlResourceSet 430, that inform UE 110 of which receive (Rx) antenna beam to use for receiving a PDCCH transmission from SCell 140. If one TCI state is configured for receiving the PDCCH transmission from SCell 140, a separate indication is not needed for a default TCI state. UE 110 interprets the configured TCI state as the active TCI state for receiving the PDCCH transmission from SCell 140. A 5G wireless network (e.g., gNB 120) can configure multiple candidate TCI states for operation in SCell 140. When multiple candidate TCI states are configured, gNB 120 can indicate as shown in in SCellConfig 410 and ControlResourceSet 430, the default TCI state corresponding to a Rx antenna beam for UE 110 to receive PDCCH transmission from SCell 140. In some embodiments the default TCI state is the first TCI state as shown by firstTciStatePDCCH 420 and firstTciStatePDCCH 440, respectively. Further, UE 110 can activate the default TCI state for UE 110 to receive a PDCCH transmission concurrently with activating SCell 140.

Figure 5:
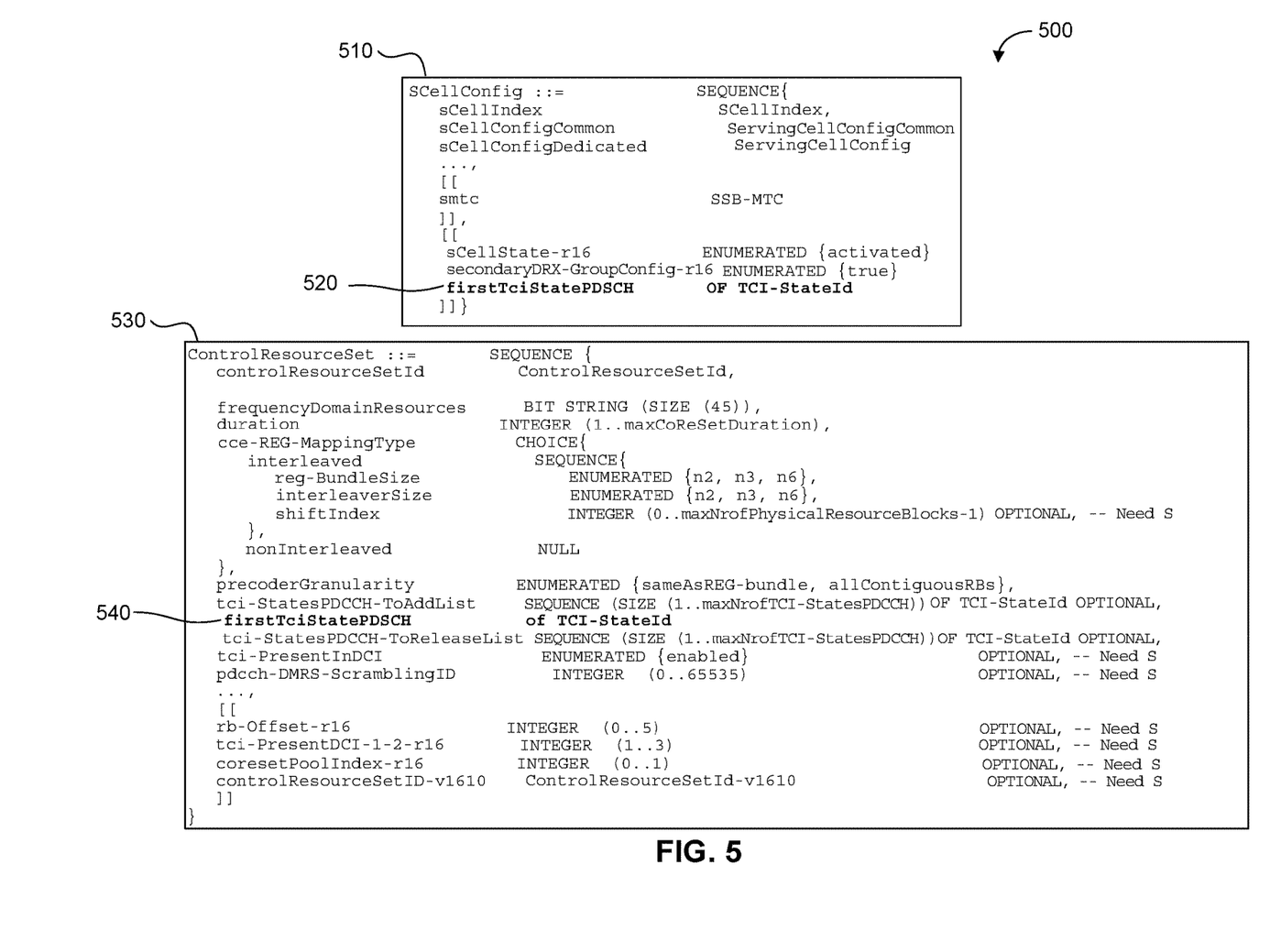
FIG. 5 illustrates example RRC commands including a TCI state activation for a Physical Downlink Shared Channel (PDSCH) transmission supporting enhanced direct SCell activation, according to some embodiments of the disclosure.

FIG. 5 illustrates example 500 RRC commands including a TCI state activation for a PDSCH transmission supporting enhanced direct SCell activation, according to some embodiments of the disclosure. As a convenience and not a limitation, FIG. 5 may be described with elements of other figures in this disclosure. For example, the RRC commands of example 500 can be RRC command 365 of FIG. 3C. Example 500 illustrates RRC commands: SCellConfig 510 and ControlResourceSet 530, that inform UE 110 of which Rx antenna beam to use for receiving a PDSCH transmission from SCell 140. If one TCI state is configured for UE 110 to receive a PDSCH transmission from SCell 140, a separate indication is not needed for a default TCI state. UE 110 interprets the configured TCI state as the active TCI state corresponding to the antenna beam for receiving PDSCH transmission from SCell 140. A 5G wireless network (e.g., gNB 120) can configure multiple candidate TCI states for operation in SCell 140. When multiple candidate TCI states are configured, gNB 120 can indicate as shown in in SCellConfig 510 and ControlResourceSet 530, the default TCI state for UE 110 to receive a PDSCH transmission (e.g., from SCell 140 of gNB 120). In some embodiments, the default TCI state is the first TCI state as shown by firstTciStatePDSCH 520 and firstTciStatePDSCH 540, respectively. Further, UE 110 can activate the default TCI state corresponding to a Rx antenna beam for UE 110 to receive a PDSCH transmission concurrently with activating SCell 140. In some embodiments, UE 110 can activate SCell 140 concurrently with: a first default TCI state for receiving a PDSCH transmission and/or a second default TCI state for receiving a PDCCH transmission. In some embodiments, the first TCI state can be used for the SCell for receiving a PDCCH transmission and a PDSCH transmission.

Figure 6:
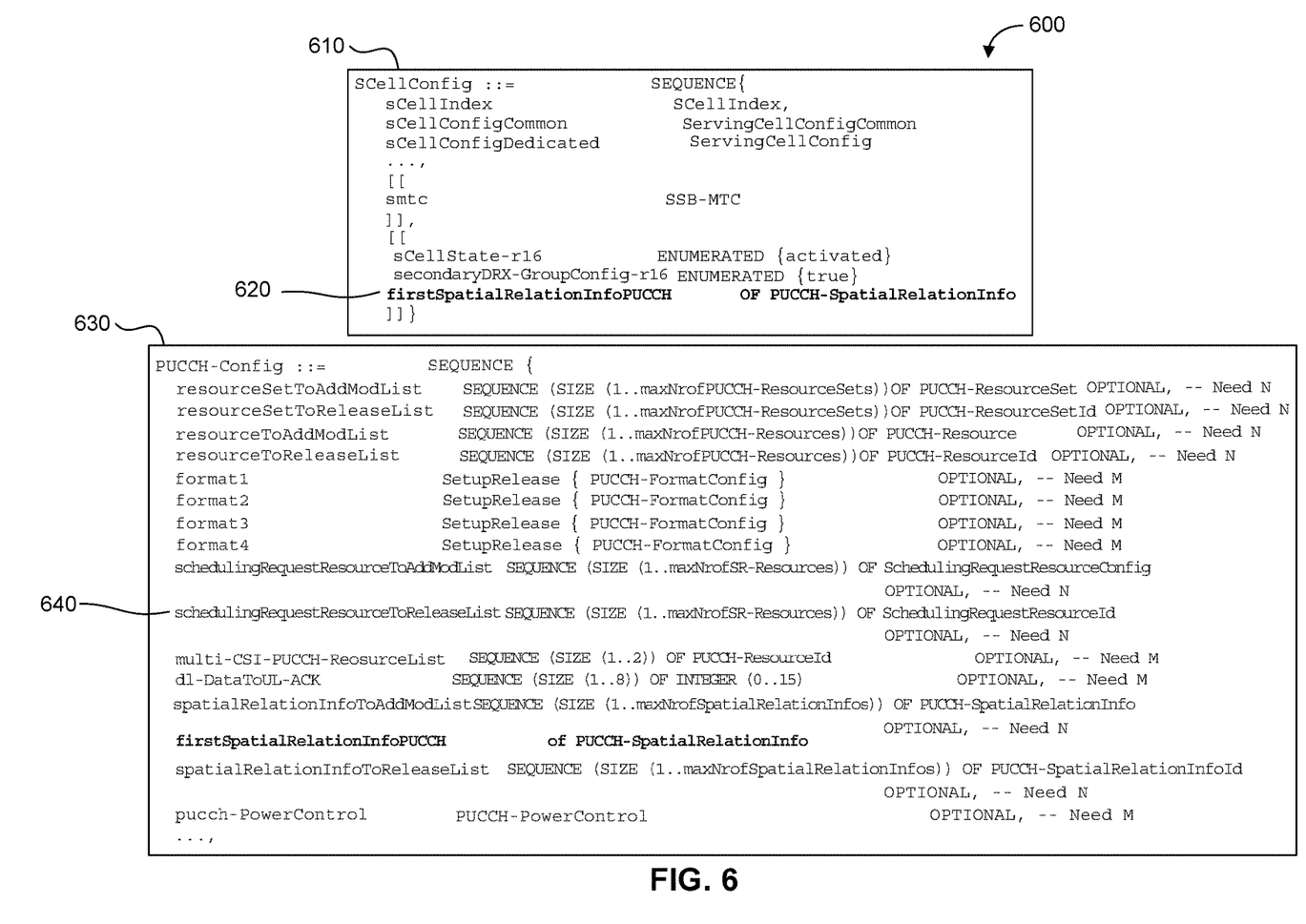
FIG. 6 illustrates example RRC commands including antenna beam transmission information for a Physical Uplink Control Channel (PUCCH) transmission supporting enhanced direct SCell activation, according to some embodiments of the disclosure.

FIG. 6 illustrates example 600 RRC commands including antenna beam transmission information for a Physical Uplink Control Channel (PUCCH) transmission supporting enhanced direct SCell activation, according to some embodiments of the disclosure. As a convenience and not a limitation, FIG. 6 may be described with elements of other figures in this disclosure. For example, the RRC commands of example 600 can be RRC command 365 of FIG. 3C. Example 600 illustrates RRC commands: SCellConfig 610 and PUCCH-Config 630, that inform UE 110 of which transmit (Tx) antenna beam to use for PUCCH transmission when UE 110 is in SCell 140. Providing this information to UE 110 avoids uplink antenna beam training which requires additional time and processing. In some embodiments when there is no PUCCH transmission in the SCell, the UE can transmit a PUCCH transmission via PCell 130, a Primary SCell (PSCell), or other SCells (not shown.)

If one spatialRelationInfo parameter is configured for PUCCH transmission for SCell 140, a separate indication is not needed for a default spatialRelationInfo parameter. UE 110 interprets the configured spatialRelationInfo parameter as the active spatialRelationInfo parameter for transmitting a PUCCH transmission for SCell 140. A 5G wireless network (e.g., gNB 120) can configure multiple candidate spatialRelationInfo parameters for operation in SCell 140. When multiple candidate spatialRelationInfo parameters are configured, gNB 120 can indicate as shown in in SCellConfig 610 and PUCCH-Config 630, the default spatialRelationInfo parameter for PUCCH transmission. In some embodiments the default spatialRelationInfo parameter is the first spatialRelationInfo parameter as shown by firstSpatialRelationInfoPUCCH 620 and firstSpatialRelationInfoPUCCH 640, respectively. Further, UE 110 can activate the default firstSpatialRelationInfoPUCCH parameter for PUCCH transmission concurrently with activating SCell 140. In some embodiments, UE 110 can activate SCell 140 concurrently with: the default firstSpatialRelationInfoPUCCH parameter for PUCCH transmission, a first default TCI state for receiving a PDSCH transmission from SCell 140, and/or a second default TCI state for receiving a PDCCH transmission from SCell 140.

Figure 7:
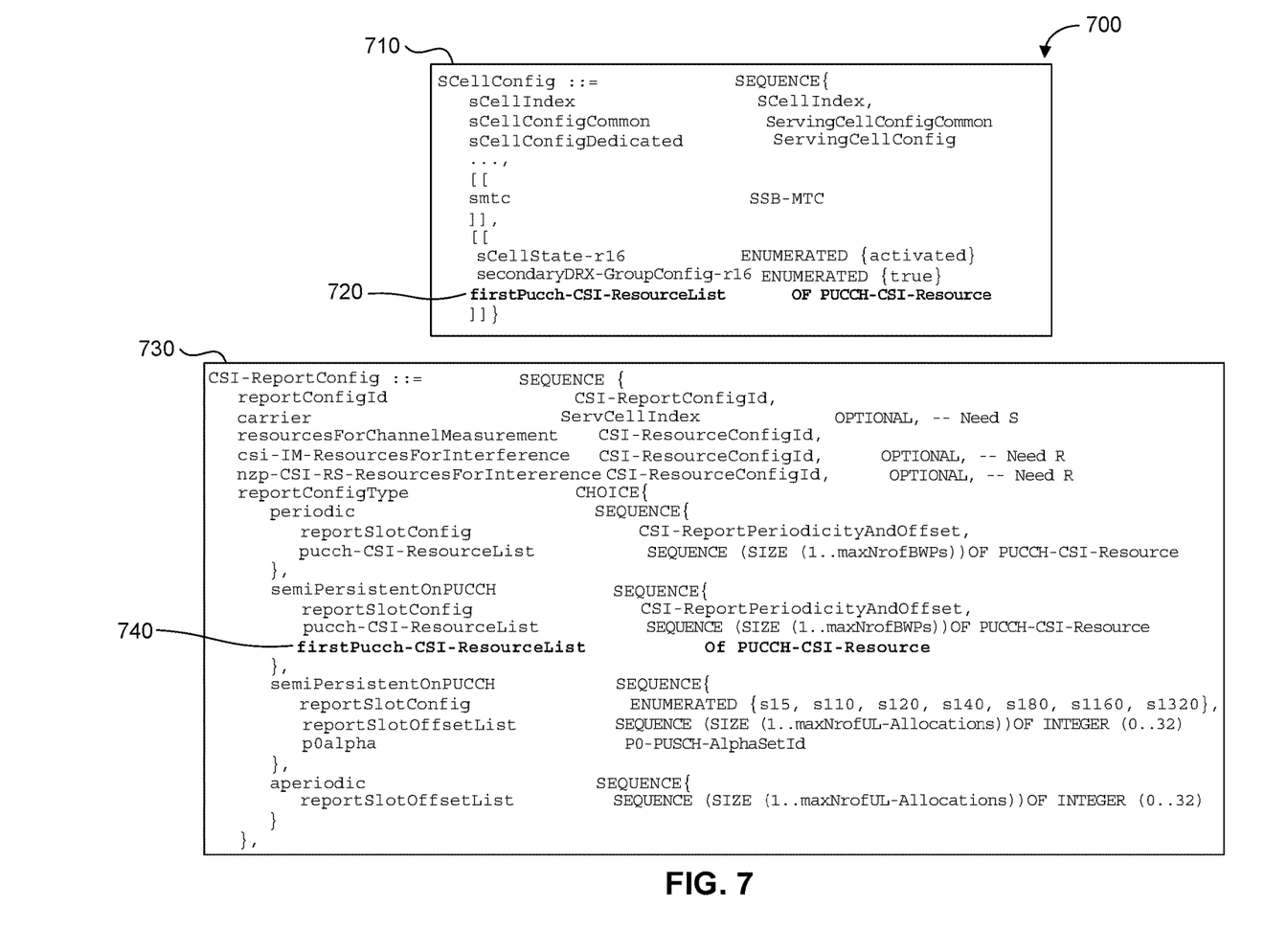
FIG. 7 illustrates example RRC commands including Channel State Information (CSI)-Reference Signal (RS) activation for a Physical Uplink Control Channel (PUCCH) transmission supporting enhanced direct SCell activation, according to some embodiments of the disclosure.

FIG. 7 illustrates example 700 RRC commands including Channel State Information (CSI)-Reference Signal (RS) activation for a PUCCH transmission supporting enhanced direct SCell activation, according to some embodiments of the disclosure. As a convenience and not a limitation, FIG. 7 may be described with elements of other figures in this disclosure. For example, the RRC commands of example 400 can be RRC command 365 of FIG. 3C. Example 700 illustrates RRC commands: SCellConfig 710 and CSI-ReportConfig 730, that inform UE 110 of which semi-persistent (SP) CSI-RS to use for CSI reporting on a PUCCH transmission when UE 110 is in SCell 140. Providing this information to UE 110 allows UE 110 to use the activated SP CSI-RS to evaluate Channel Quality Indicator (CQI), Precoding Matrix Indicator (PMI), and/or Rank Indicator (RI) for secure reporting.

If one pucch-CSI-Resource parameter is configured in the pucch-CSI-ResourceList parameter for PUCCH transmission for SCell 140, a separate indication is not needed for a default pucch-CSI-ResourceList parameter. UE 110 interprets the configured pucch-CSI-ResourceList parameter as the active pucch-CSI-Resource for SP CSI reporting (e.g., evaluating CQI, PMI, and/or RI) and reporting via PUCCH transmission via SCell 140. A 5G wireless network (e.g., gNB 120) can configure multiple candidate pucch-CSI-Resource parameters for operation in SCell 140. When multiple candidate pucch-CSI-Resource parameters are configured, gNB 120 can indicate as shown in in SCellConfig 710 and CSI-ReportConfig 730, the default pucch-CSI-ResourceList parameter for PUCCH transmission. In some embodiments the default pucch-CSI-ResourceList parameter is the first pucch-CSI-ResourceList parameter as shown by firstPucch-CSI-ResourceList 720 and firstPucch-CSI-ResourceList 740, respectively. Further, UE 110 can activate the default firstPucch-CSI-ResourceList for PUCCH transmission concurrently with activating SCell 140. In some embodiments, UE 110 can activate SCell 140 concurrently with: the default firstPucch-CSI-ResourceList for a PUCCH transmission, a default firstSpatialRelationInfoPUCCH for PUCCH transmission, a first default TCI state for receiving a PDSCH transmission, and/or a second default TCI state for receiving a PDCCH transmission. In some embodiments, RRC command 365 can include firstTciStatePDCCH 420, firstTciStatePDSCH 520, firstSpatialRelationInfoPUCCH 620, and/or firstPucch-CSI-ResourceList 720.

Figure 8:
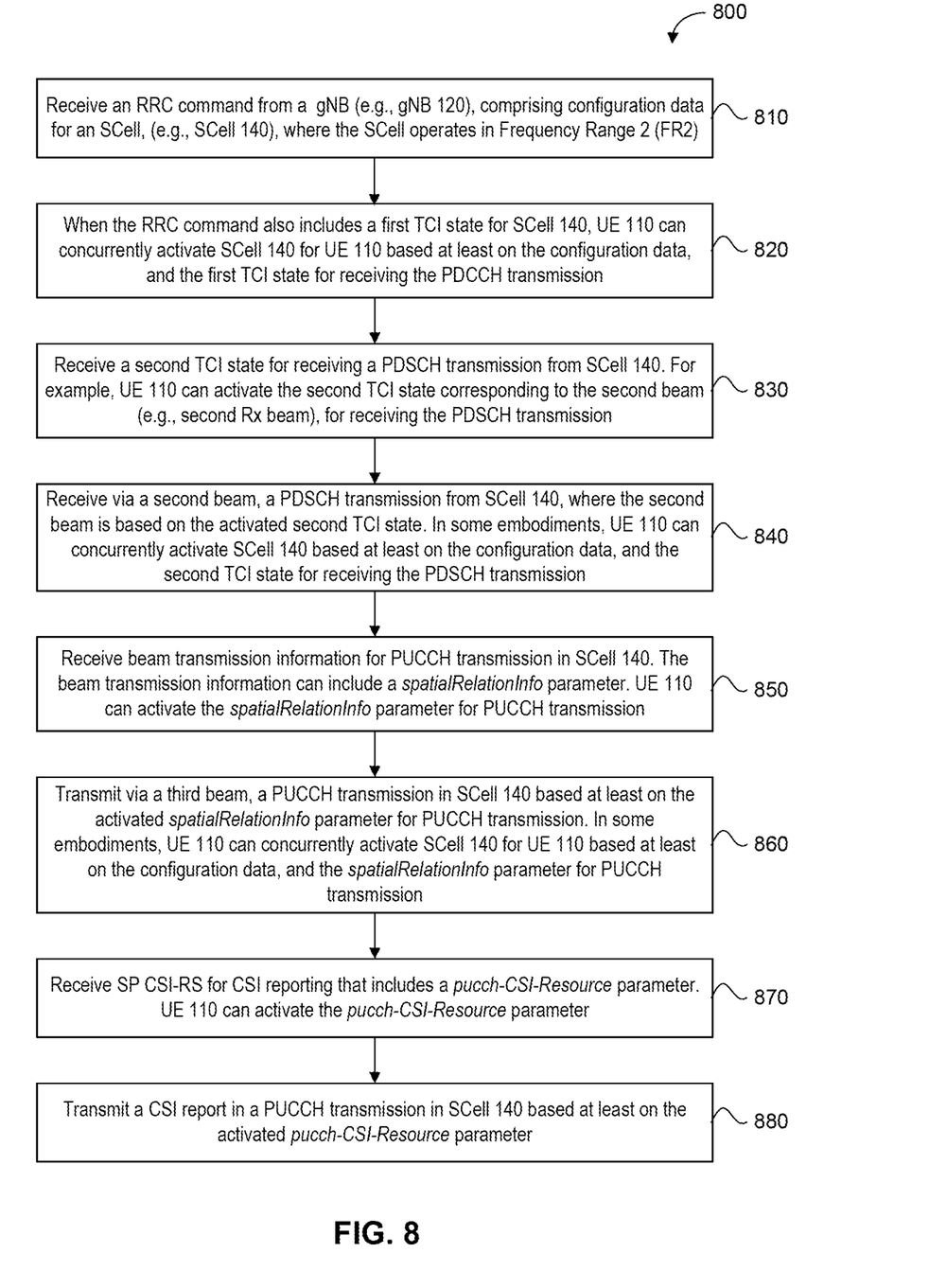
FIG. 8 illustrates a method for an example user equipment (UE) supporting enhanced direct SCell activation, according to some embodiments of the disclosure.

FIG. 8 illustrates method 800 for example UE 110 supporting enhanced direct SCell activation, according to some embodiments of the disclosure. As a convenience and not a limitation, FIG. 8 may be described with elements of other figures in this disclosure. For example, method 800 can be performed by system 200 of FIG. 2 or system 1000 of FIG. 10.

At 810, UE 110 can receive an RRC command from a gNB (e.g., gNB 120) via the Primary Cell (e.g., PCell 130), comprising configuration data for an SCell, SCell 140), where the SCell operates in Frequency Range 2 (FR2). The RRC command can be an SCellConfig RRC command.

At 820, when the RRC command also includes a first TCI state for SCell 140, UE 110 can concurrently activate SCell 140 for UE 110 based at least on the configuration data, and the first TCI state for receiving the PDCCH transmission. If multiple candidate TCI states are available, gNB 120 can determine and indicate a first default TCI state of a first TCI state list, and the first TCI state can be the first default TCI state in the configuration data. UE 110 activates the first TCI state and subsequently receives a PDCCH transmission via a first antenna beam from SCell 140, where the first antenna beam (e.g., first Rx beam) is based on the activated first TCI state.

At 830, UE 110 can receive a second TCI state for receiving a PDSCH transmission from SCell 140. To receive the second TCI state, UE 110 can receive a ControlResourceSet RRC command, or an SCellConfig RRC command. If multiple candidate TCI states are available, gNB 120 can determine and indicate a second default TCI state of a second TCI state list, and the second TCI state can be the second default TCI state. For example, UE 110 can activate the second TCI state corresponding to the second antenna beam (e.g., second Rx beam), for receiving the PDSCH transmission.

At 840, UE 110 can receive a PDSCH transmission via a second antenna beam from SCell 140, where the second antenna beam is based on the activated second TCI state. In some embodiments, UE 110 can concurrently activate SCell 140 based at least on the configuration data, and the second TCI state for receiving the PDSCH transmission.

At 850, UE 110 can receive antenna beam transmission information for PUCCH transmission in SCell 140. UE 110 can receive the antenna beam transmission information via a PUCCH-Config RRC command and/or an SCellConfig RRC command. The antenna beam transmission information can include a spatialRelationInfo parameter. When the antenna beam transmission information includes multiple candidate spatialRelationInfo parameters, gNB 120 can determine a default spatialRelationInfo parameter from the multiple candidate spatialRelationInfo parameters for PUCCH transmission. The default spatialRelationInfo parameter can be the spatialRelationInfo parameter in the antenna beam transmission information. UE 110 can activate the spatialRelationInfo parameter for PUCCH transmission.

At 860, UE 110 can transmit via a third beam, a PUCCH transmission in SCell 140 based at least on the activated spatialRelationInfo parameter for PUCCH transmission. In some embodiments, UE 110 can concurrently activate SCell 140 for UE 110 based at least on the configuration data, and the spatialRelationInfo parameter for PUCCH transmission.

At 870, UE 110 can receive SP CSI-RS for CSI reporting that includes a pucch-CSI-Resource parameter. UE 110 can receive the pucch-CSI-Resource parameter via a CSI-ReportConfig RRC command, or an SCellConfig RRC command. When the SP CSI-RS for PUCCH transmission includes a pucch-CSI-ResourceList parameter, gNB 120 can determine a default pucch-CSI-Resource parameter for PUCCH transmission, where the pucch-CSI-Resource parameter can be the default pucch-CSI-Resource parameter. UE 110 can activate the pucch-CSI-Resource parameter.

At 880, UE 110 can transmit a CSI report in a PUCCH transmission in SCell 140 based at least on the activated pucch-CSI-Resource parameter.

Figure 9:
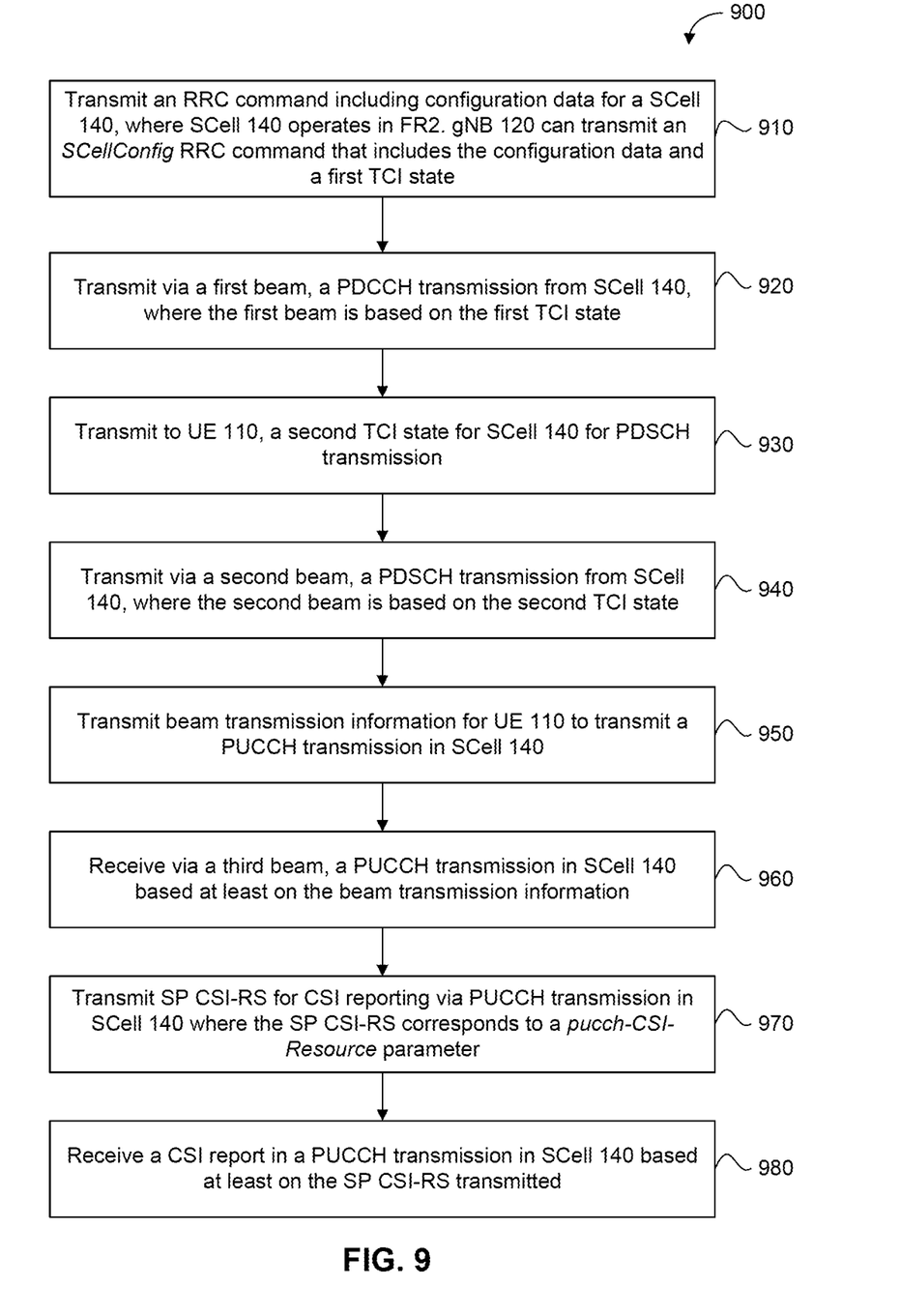
FIG. 9 illustrates a method for an example 5G Node B (gNB) supporting enhanced direct SCell activation, according to some embodiments of the disclosure.

FIG. 9 illustrates method 900 for an example 5G Node B (gNB) supporting enhanced direct SCell activation, according to some embodiments of the disclosure. As a convenience and not a limitation, FIG. 9 may be described with elements of other figures in this disclosure. For example, method 900 can be performed by system 200 of FIG. 2 or system 1000 of FIG. 10.

At 910, gNB 120 can transmit via the Primary Cell (e.g., PCell 130) an RRC command including configuration data for a SCell 140, where SCell 140 operates in FR2. gNB 120 can transmit an SCellConfig RRC command that includes the configuration data and a first TCI state. If multiple candidate TCI states are available, gNB 120 can determine and indicate the first default TCI state of a first TCI state list and include the first default TCI state in the configuration data. The first TCI state can be the first default TCI state.

At 920, gNB 120 can transmit a PDCCH transmission via a first antenna beam, from SCell 140, where the first antenna beam is based on the first TCI state. For example, UE 110 can use the first TCI state to activate a Rx antenna beam for receiving the PDCCH transmission.

At 930, gNB 120 can transmit to UE 110, a second TCI state for SCell 140 for PDSCH transmission. To transmit the second TCI state, gNB 120 can transmit a ControlResource- Set RRC command or an SCellConfig RRC command. When multiple candidate TCI states are available, gNB 120 can determine and indicate a second default TCI state in a second TCI state list. The second TCI state can be the second default TCI state.

At 940, gNB 120 can transmit a PDSCH transmission via a second antenna beam from SCell 140, where the second antenna beam is based on the second TCI state. For example, UE 110 can use the second TCI state to activate a Rx antenna beam to receive the PDSCH transmission.

At 950, gNB can transmit antenna beam transmission information for UE 110 to transmit a PUCCH transmission in SCell 140. The gNB 120 can transmit the antenna beam transmission information, via a PUCCH-Config RRC command and/or an SCellConfig RRC command. The antenna beam transmission information can include a spatialRelationInfo parameter. When the antenna beam transmission information includes multiple candidate spcitialRelationInfo parameters, gNB 120 sets a default spatialRelationInfo parameter for PUCCH transmission from the multiple candidate spatialRelationInfo parameters. The spatialRelationInfo parameter can be the default spatialRelationInfo parameter. UE 110 can activate the spatialRelationInfo parameter for PUCCH transmission that corresponds to the antenna beam transmission information.

At 960, gNB can receive via a third beam, a PUCCH transmission in SCell 140 based at least on the antenna beam transmission information.

At 970, gNB 120 can transmit SP CSI-RS for CSI reporting via PUCCH transmission in SCell 140 via a CSI-ReportConfig RRC command and/or an SCellConfig RRC command. The SP CSI-RS corresponds to a pucch-CSI-Resource parameter. When a multiple candidate pucch-CSI-ResourceList parameter is present, the SP CSI-RS includes a default pucch-CSI-Resource parameter. For example, gNB 120 can set a default pucch-CSI-Resource parameter of a multiple candidate pucch-CSI-ResourceList parameter. The pucch-CSI-Resource parameter can be a default pucch-CSI-Resource parameter. UE 110 can activate the pucch-CSI-Resource parameter for PUCCH transmission.

At 980, gNB 120 can receive a CSI report in a PUCCH transmission in SCell 140 based at least on the SP CSI-RS transmitted.

Figure 10:
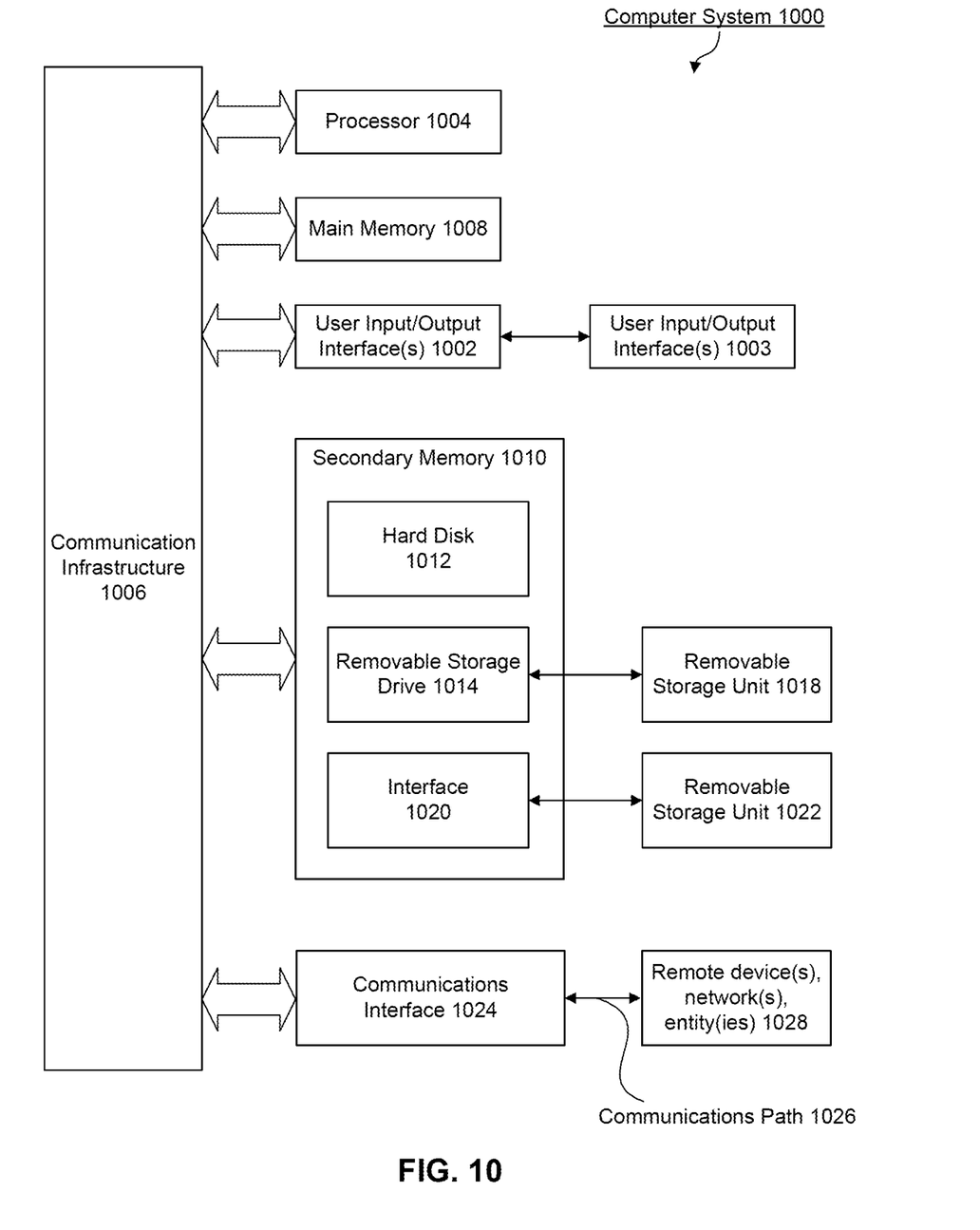
FIG. 10 is an example computer system for implementing some embodiments or portion(s) thereof.

Various embodiments can be implemented, for example, using one or more well-known computer systems, such as computer system 1000 shown in FIG. 10. Computer system 1000 can be any well-known computer capable of performing the functions described herein. For example, and without limitation, system 200 of FIG. 2, method 800 of FIG. 8, and method 900 of FIG. 9 (and/or other apparatuses and/or components shown in the figures) may be implemented using computer system 1000, or portions thereof.

Computer system 1000 includes one or more processors (also called central processing units, or CPUs), such as a processor 1004. Processor 1004 is connected to a communication infrastructure 1006 that can be a bus. One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to some embodiments, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A user equipment (UE), comprising:
    a transceiver configured to operate in a wireless network; and
    a processor coupled to the transceiver, configured to:
        receive, via the transceiver, a Radio Resource Control (RRC) command from a base station (BS), comprising configuration data for a Secondary Cell (SCell), wherein the SCell operates in Frequency Range 2 (FR2), and wherein the RRC command includes a first Transmission Configuration Indicator (TCI) state for the SCell and antenna beam transmission information for Physical Uplink Control Channel (PUCCH) transmission in the SCell;
        activate, based on the configuration data, the SCell for the UE, the first TCI state for receiving a Physical Downlink Control Channel (PDCCH) transmission, and the antenna beam transmission information for PUCCH transmission in the SCell; and
        receive, via the transceiver, the PDCCH transmission on a first antenna beam from the SCell, wherein the first antenna beam is based on the first TCI state.

2. The UE of claim 1, wherein the processor is further configured to:
    receive, via the transceiver, a second TCI state for the SCell for receiving a Physical Downlink Shared Channel (PDSCH) transmission; and
    receive, via the transceiver, the PDSCH transmission on a second antenna beam from the SCell, wherein the second antenna beam is based on the second TCI state.

3. The UE of claim 2, wherein the processor is further configured to: activate the second TCI state for receiving the PDSCH transmission.

4. The UE of claim 2, wherein to receive the second TCI state, the processor is configured to: receive, via the transceiver, a ControlResourceSet RRC command comprising the second TCI state.

5. The UE of claim 2, wherein the RRC command is an SCellConfig RRC command that comprises the second TCI state.

6. The UE of claim 1, wherein the processor is further configured to:
    transmit, via the transceiver, a PUCCH transmission on a second antenna beam to the SCell based at least on the antenna beam transmission information.

7. The UE of claim 1, wherein the antenna beam transmission information comprises multiple candidate spatialRelationInfo parameters, the processor is further configured to:
    activate a default spatialRelationInfo parameter for PUCCH transmission from the multiple candidate spatialRelationInfo parameters, wherein the default spatialRelationInfo parameter corresponds to the antenna beam transmission information.

8. The UE of claim 6, wherein to receive the antenna beam transmission information, the processor is configured to: receive, via the transceiver, a PUCCH-Config RRC command comprising a spatialRelationInfo parameter.

9. The UE of claim 6, wherein the RRC command is an SCellConfig RRC command that comprises a spatialRelationInfo parameter.

10. The UE of claim 1, wherein the processor is further configured to:
    receive, via the transceiver, semi-persistent (SP) Channel State Information (CSI)-Reference Signal (RS) for PUCCH transmission in the SCell; and
    transmit, via the transceiver, a CSI report in a PUCCH transmission in the SCell based at least on the SP CSI-RS for PUCCH transmission.

11. The UE of claim 10, wherein the SP CSI-RS for PUCCH transmission comprises a pucch-CSI-ResourceList parameter, the processor is further configured to: activate a default pucch-CSI-ResourceList parameter for PUCCH transmission, wherein the default pucch-CSI-ResourceList parameter corresponds to the SP CSI-RS.

12. The UE of claim 10, wherein to receive the SP CSI-RS for PUCCH transmission, the processor is configured to: receive a CSI-ReportConfig RRC command.

13. The UE of claim 10, wherein the RRC command is an SCellConfig RRC command that comprises the SP CSI-RS for PUCCH transmission.

14. A base station (BS), comprising:
    a transceiver configured to operate in a wireless network; and
    a processor coupled to the transceiver, configured to:
        transmit, via the transceiver, a Radio Resource Control (RRC) command comprising configuration data for activation of a Secondary Cell (SCell), wherein the RRC command comprises a first Transmission Configuration Indicator (TCI) state for the SCell, that operates in Frequency Range 2 (FR2), and antenna beam transmission information for Physical Uplink Control Channel (PUCCH) transmission in the SCell; and
        transmit, via the transceiver, a Physical Downlink Control Channel (PDCCH) transmission on a first antenna beam via the SCell, wherein the first antenna beam is based on the first TCI state.

15. The BS of claim 14, wherein the processor is further configured to:
    transmit, via the transceiver, a second TCI state for the SCell for Physical Downlink Shared Channel (PDSCH) transmission; and
    transmit, via the transceiver, a PDSCH transmission on a second antenna beam from the SCell, wherein the second antenna beam is based on the second TCI state.

16. A method for a user equipment (UE), comprising:
    receiving a Radio Resource Control (RRC) command from a base station (BS), comprising configuration data for a Secondary Cell (SCell), wherein the SCell operates in Frequency Range 2 (FR2), wherein the RRC command comprises a first Transmission Configuration Indicator (TCI) state for the SCell and antenna beam transmission information for Physical Uplink Control Channel (PUCCH) transmission in the SCell;
    activating, based on the configuration data, the SCell for the UE, the first TCI state for receiving a Physical Downlink Control Channel (PDCCH) transmission, and the antenna beam transmission information for PUCCH transmission in the SCell; and
    receiving the PDCCH transmission on a first antenna beam from the SCell, wherein the first antenna beam is based on the first TCI state.

17. The method of claim 16, further comprising:
receiving a second TCI state for the SCell for receiving a Physical Downlink Shared Channel (PDSCH) transmission;
receiving the PDSCH transmission on a second antenna beam from the SCell, wherein the second antenna beam is based on the second TCI state.

18. The method of claim 16, further comprising:
transmitting a PUCCH transmission on a second antenna beam to the SCell based at least on the antenna beam transmission information.

19. The method of claim 18, wherein the antenna beam transmission information comprises multiple candidate spatialRelationInfo parameters, the method further comprises:
activating a default spatialRelationInfo parameter for PUCCH transmission from the multiple candidate spatialRelationInfo parameters, wherein the default spatialRelationInfo parameter corresponds to the antenna beam transmission information.

20. The method of claim 16, further comprising:
receiving semi-persistent (SP) Channel State Information (CSI)-Reference Signal (RS) for PUCCH transmission in the SCell; and
transmitting a CSI report in a PUCCH transmission in the SCell based at least on the SP CSI-RS for PUCCH transmission.

* * * * *